United States Patent [19]

Engdahl

[11] Patent Number: 4,524,700
[45] Date of Patent: Jun. 25, 1985

[54] OPENING COVER FOR RAILROAD CARS

[75] Inventor: Roger Engdahl, St. Paul, Minn.

[73] Assignee: Proform, Inc., Minneapolis, Minn.

[21] Appl. No.: 385,944

[22] Filed: Jun. 7, 1982

[51] Int. Cl.³ .............................................. B61D 39/00
[52] U.S. Cl. ...................................... 105/377; 49/116; 296/100; 105/240
[58] Field of Search .................... 105/377, 240; 52/48, 52/49, 50, 796, 797, 798; 49/116, 121, 123; 292/302; 296/31 P, 100, 101

[56] References Cited

U.S. PATENT DOCUMENTS

| | | | |
|---|---|---|---|
| 2,885,039 | 5/1959 | MacFarland | 292/302 |
| 2,893,329 | 7/1959 | Janeczko | 105/377 |
| 2,899,912 | 8/1959 | Janeczko | 105/377 |
| 3,370,380 | 2/1968 | Petros | 49/123 |
| 3,429,083 | 2/1969 | Voros | 105/377 |
| 3,457,879 | 7/1969 | Rebenok et al. | 105/377 |
| 3,587,476 | 6/1971 | Ingram | 296/31 P |
| 3,628,828 | 12/1971 | Page et al. | 105/377 X |
| 3,796,168 | 3/1974 | Zeller | 105/377 |
| 4,120,065 | 10/1978 | Sivachenko et al. | 52/797 |

Primary Examiner—David A. Scherbel
Assistant Examiner—Glenn B. Foster
Attorney, Agent, or Firm—Oblon, Fisher, Spivak, McClelland & Maier

[57] ABSTRACT

An opening cover of fiberglass is provided for hopper railroad cars, whereby the car may be loaded from above by causing the halves of the cover to move outward through a cable drive system. The covers are of an aero-dynamic shape which provides for negative lift and drag. By employing light-weight materials and an aero-dynamic shape, substantial advantages in fuel cost and consumption can be achieved, while providing for easy loading and protection of cargo through the translational movement of the cover halves.

7 Claims, 9 Drawing Figures

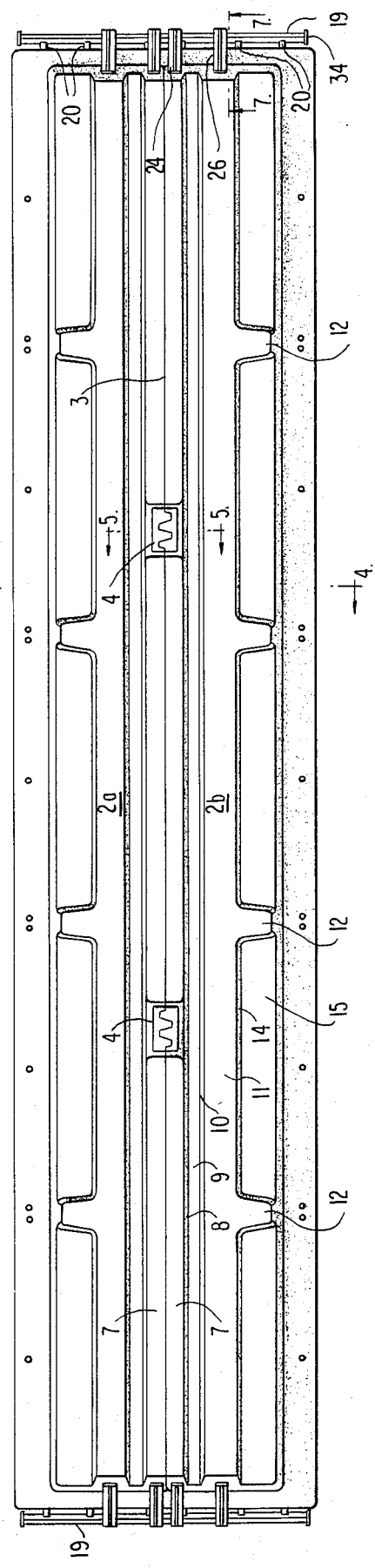
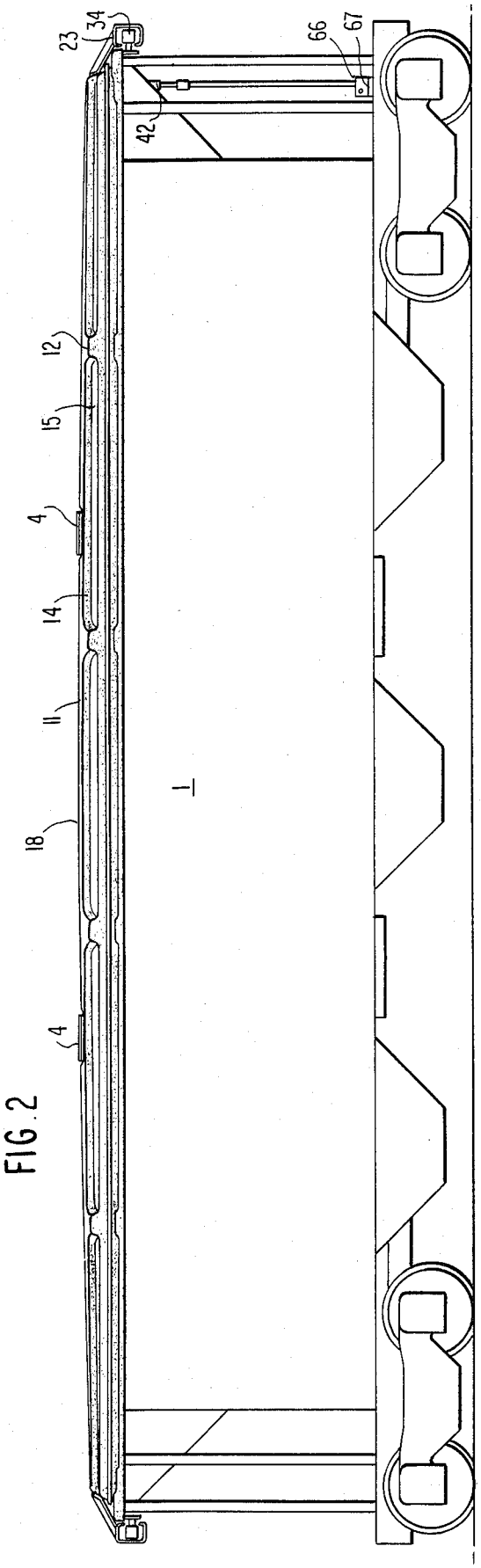

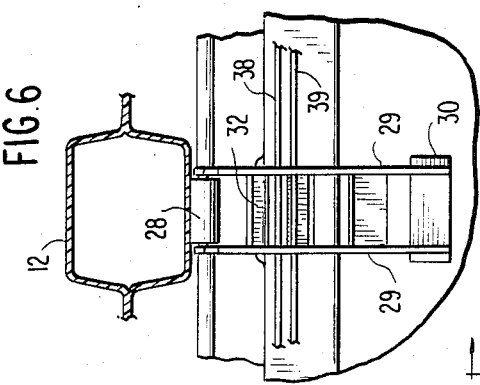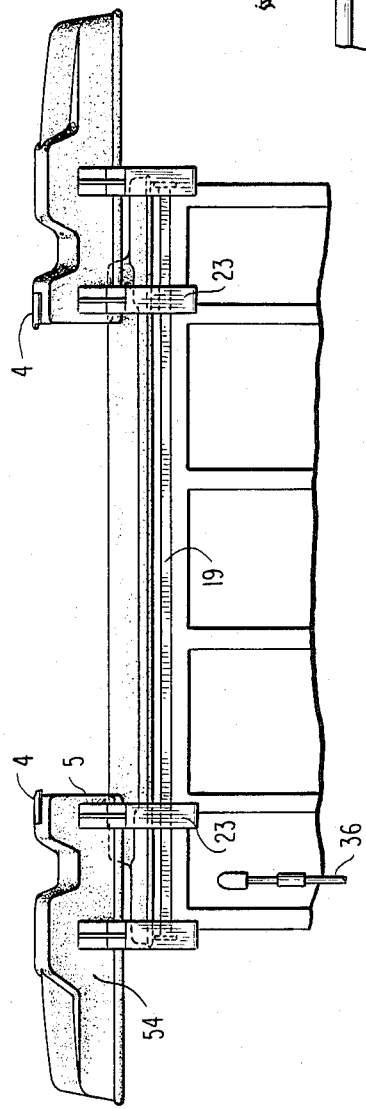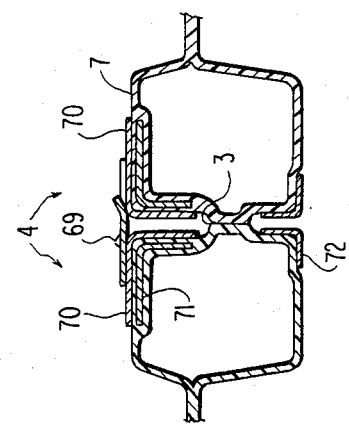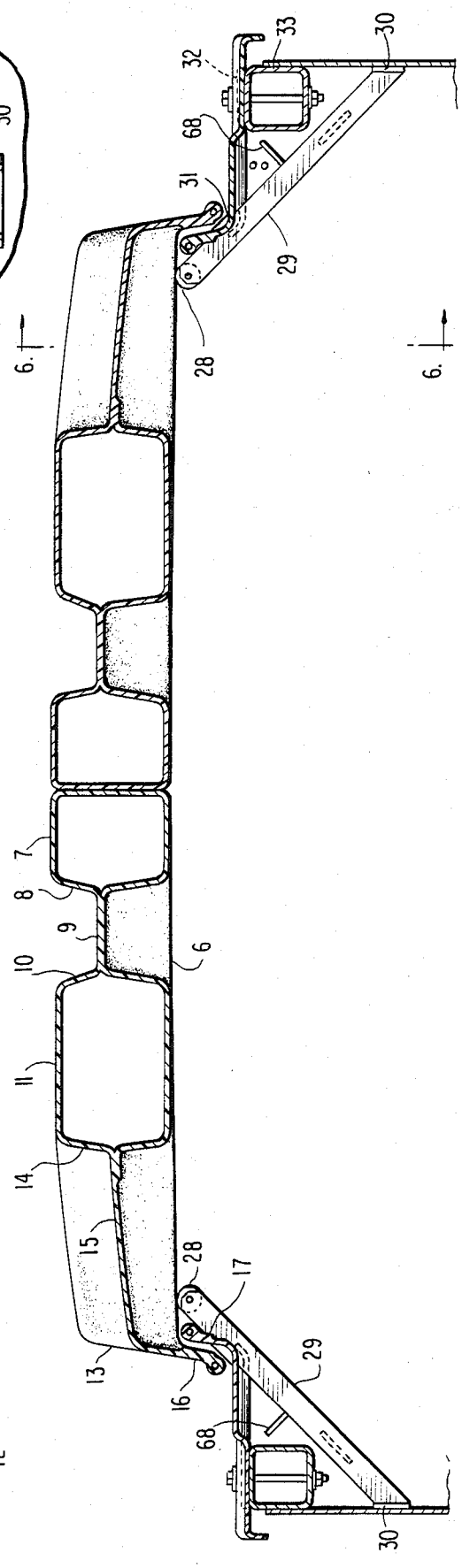

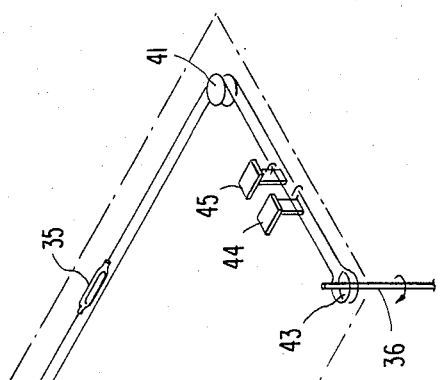
FIG.7
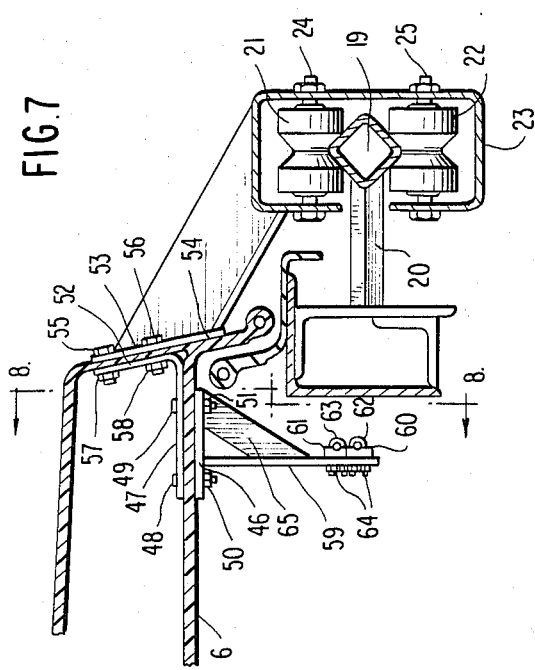
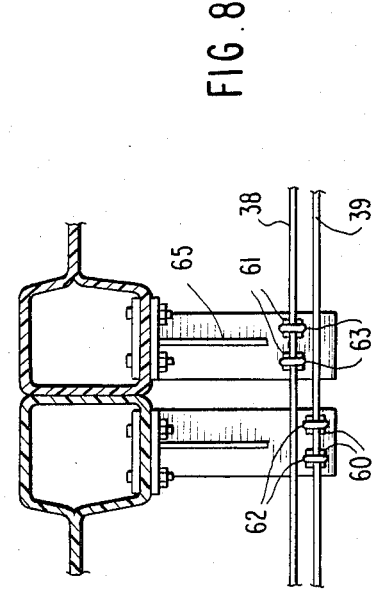
FIG.8
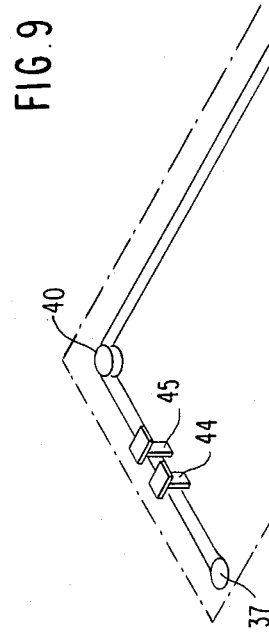
FIG.9

OPENING COVER FOR RAILROAD CARS

FIELD OF THE INVENTION

The invention disclosed and claimed herein is a light-weight cover for open railroad cars so as to protect the material carried inside the cars from the elements and other sources of contamination or degradation. Specifically, the cover is designed so as to separate in the middle, each half being capable of sliding outward so as to create an opening directly over the center of the car, through which cargo may be loaded, the covers thereafter being closed and secured, thereby protecting cargo. The cover is particularly designed to be both light-weight and create a negative lifting force when the car is in motion.

Opening and closing of the cover halves is achieved through a single cable system, which cable is divided into lower and upper portions, and caused to be moved back and forth by means of a crank shaft attached to a gear reduction mechanism which may be operated manually. When comprised of fiberglass, the cover itself, together with its associated drive means, is extremely light-weight, thereby saving on fuel costs while observing the necessary strength requirements of such a cover.

BACKGROUND OF THE PRIOR ART

The art has long recognized the need to provide covers for railroad cars that are open at the top, so as to protect the materials carried in the interior of the railroad car from damage caused by elements or other external sources. In particular, materials such as coal and similar fuel sources, as well as food stuffs and other perishable materials should be covered, principally to avoid damage caused by water entering the railroad car interior.

Desirably, railroad cars carrying material in bulk should be open at the top, so as to provide an easy means of loading cargo through a hopper which is suspended over the top of the railroad car, and unloading cargo through the simple expedient of tipping the railroad car on its side, or otherwise scooping the material out by use of a crane or similar apparatus. However, such openings are necessarily directly exposed to the weather. Accordingly, railroad cars in the prior art have frequently been provided with heavy covers made with steel or similar material, which necessitated complex and difficult removal prior to loading and unloading.

The same covers due to their weight, substantially increased transportation costs in terms of the amount of fuel that must be consumed to transport the same amount of material an equivalent distance as that consumed with an uncovered railroad car. Further, the same covers often presented a wide face to the wind created by the railroad cars passage, such that wind resistance caused a "lifting effect" requiring bulky, heavy means of attachment to the railroad car itself. This wind resistance also further increased transportation costs by increasing equivalent fuel consumption.

Accordingly, it is one object of this invention to provide a light-weight railroad cover that may simply and easily be opened so as to allow loading of the railroad car from above, and unloading through the top or open end of the railroad car.

A second object of this invention is to provide a railroad car cover which is light-weight, yet strong enough to meet the demands placed upon such covers, while providing a weather-and-water tight protection for the material within the railroad car.

Yet a further object of this invention is a railroad car cover which, because of its structural design, provides a reduced lift while in motion, thereby eliminating the need for heavy attachments or alternative means of securing the cover to the top of the railroad car.

Further objects of this invention will be apparent from its description below.

SUMMARY OF THE INVENTION

The railroad car cover disclosed herein is comprised of two interlocking halves, which rest on top of a upwardly open railroad car and completely cover the opening therein when in a closed position. The cover is preferably made of fiberglass or similar light-weight structural material. These halves may be caused to undergo translational movement away from and toward the center of the railroad car by a simple cable drive means, such that, when fully opened, a substantial opening of a width of more than 6 feet is provided through the now separated cover into the interior of the railroad car. When the railroad car is positioned under a hopper or similar loading device, the two cover halves may be caused to roll outward on tracks at each end of the railroad car and on rollers along the side thereof to provide an opening through which loading can be easily effected.

The cover, when joined, may exhibit a cross-section with 3 raised portions and notches therebetween and lower portions distal of each outer raised portion. This configuration will be termed "notched" herein. The raised portions increase in height along the length of the railroad car from both ends toward the center, so that, when viewed from the side, the cover halves define an upper envelope surface which is dome-shaped, the spaces between raised portions lying below that envelope.

The cover halves may be caused to roll outward and back together by means of a cable drive system, which employs a single continuous cable attached to a crank shaft actuated through a reduction gear mechanism, which provides steady parallel motion.

The car cover halves, when caused to move by operation of the cable drive system, may roll outward or inward along tracks provided at either end of the car and affixed thereto, through rollers resting on those tracks and affixed to the car cover. Additionally, at various points along the length of each half of the cover, rollers are provided along which the cover may smoothly slide or move. These rollers are supported by attachments affixed to the railroad car itself, on the interior walls of the car.

The invention may be better understood by reference to the accompanying drawings and detailed description set forth below.

BRIEF DESCRIPTION OF THE DRAWINGS

FIG. 1 is a plain view of the hatch cover in the closed position.

FIG. 2 is a side elevation view of the hatch cover, particularly illustrating the dome-shaped envelope surface of the hatch cover.

FIG. 3 is a front view of one end of the car and hatch cover with the halves of the hatch cover separated in the open position.

FIG. 4 is a cross-sectional view of the hatch cover in the closed position, particularly illustrating the roller supports provided on the interior of the railroad car.

FIG. 5 is a cross-sectional view particularly illustrating the interlocking feature of the cover in a preferred embodiment.

FIG. 6 is a longitudinal cross-section view taken along one side of the car cover, illustrating the engagement of the roller supports with the lower surface of the cover.

FIG. 7 is a cross-sectional view taken through one end of the railroad car and hatch cover, illustrating the track along which the hatch cover may roll outward and inward.

FIG. 8 is a front view of the attachment of the cable system to the hatch cover halves.

FIG. 9 is an exploded view of the cable drive system as attached to the hatch cover.

DETAILED DESCRIPTION OF THE INVENTION

As can be seen from FIGS. 1 and 2, the railroad car cover, when in the closed position, rests on top of the walls of the railroad car 1 and completely covers the upward opening therein. When closed, the left hand half of the cover 2a and right hand half 2b meet at midline 3. Spaced at various intervals along the midline 3 are interlocking portions 4, which may be comprised of fiberglass or other structural material not subject to rusting or similar degradative oxidation. When in the closed position, the two halves meet in a tight joint, which excludes water and other contaminants from the interior of the car.

As each half of the car cover is a mirror image of the other, the reference numerals for left hand half 2a and right hand half 2b will not be designated a and b as to their respective features, except where necessary to indicate differences therebetween.

Proceeding distally from the interior wall 5 of the cover halves, the halves are notched in cross-section. Interior wall 5 rises vertically from floor 6 and is intregral therewith and then extends distally as the upper surface of raised portion 7. Continuing towards the outer side of the car cover, wall 8 descends at an angle from raised portion 7 to a point lower than raised portion 7 where it continues horizontally as lowered portion 9. Wall 10 opposite wall 8 extends from lowered portion 9 upward and at an angle to horizontal raised portion 11 which is at an elevation somewhat lower than raised portion 7.

Raised portion 7, as well as walls 8 and 10 and lowered portion 9, extend longitudinally throughout the length of the car cover, except where raised portion 7 is interrupted by interlocking arrangement 4, along the mid point of the hatch cover. Raised portion 11 also extends throughout the length of the hatch cover, and at a plurality of points 12 extends to the outside edge of the car cover 13. However, with the exception of portions 12, raised portion 11 ends in wall 14 which extends at an angle and downward to lowered portions 15, which are of course bordered by raised portions 12 and the ends of the car cover. Lowered portion 15 then joins end portion 13, the hatch cover thereafter descending downward in flange 16, which cooperates with and lies outside of upwardly extending flange 17, which is affixed to the railroad car. By the cooperation of downward extending flange 16 of the car cover and upward extending flange 17 of the railroad car on both longitudinal walls of the hatch cover, lateral movement of the cover towards the interior when closed may not extend beyond the midline of the car cover.

As illustrated in FIG. 2, the raised portions of the car cover halves are higher at the middle of the car cover then at either end. Accordingly, and arch or dome-shaped envelope surface 18 is defined thereby.

Railroad car covers of this shape have been shown to be superior to prior art covers in their aero-dynamic characteristics. In practical testing in wind tunnel apparatus, cars provided with covers of the type described have been shown to experience less drag than cars without covers at all. Accordingly, the car cover of this invention may be said to provide a negative drag, i.e., enhance the economy of shipping by railroad car, due to the decreased fuel consumption necessary.

At the same time, the cover of the shape disclosed above has been shown to have a negative lift i.e., the forces generated by the motion of the car and car cover tend to force the cover on to the car, rather than lift it off the car. This is in contrast to prior art covers, which exhibit just such lifting behavior. Accordingly, the heavy locking apparatus and attachments required of prior art covers are not necessary when the car cover of this invention is employed.

One primary object of this invention is to provide a car cover which, when the halves are moved apart, provides for easy loading in the space created there between. To facilitate the movement of the separate halves 2a and 2b of the car cover, tracks 19 are provided at either end of railroad car 1, securely attached thereto through arm 20, as clearly illustrated in FIG. 7. Upper and lower wheels or pulleys 21 and 22 rest on track 19, and roll along it, when the car cover is induced to move by actuation of the cable drive system. Wheels 21 and 22 partially support the car cover and are firmly attached thereto through housing 23, which supports pulleys 21 and 22 through axles 24 and 25, respectively. The axles may be affixed to housing 23 through the use of bolts or similar means. A plurality of pairs of wheels or pulleys is desirably provided for each end of each half of the car cover. Mounting 23 is firmly attached to the car cover at points 26 and 27.

To further facilitate the translational movement of the separate car cover halves, and to support the car cover, a plurality of rollers 28 is provided, opposite the points 12 wherein the raised portion 11 of the car cover extends to the edge of the car cover. Each roller 28 is supported by a pair of angle braces 29 which are fixed to the sides of the railroad car on the interior of the car, at plate 30. These braces extend upward at an angle such that roller 28 is in contact with the bottom surface 6 of the car cover. Angle braces 29 are further supported between horizontal flanges 31 which are integrally joined with upward extending flange 17. Flanges 31 are affixed to the railroad car at plate 32 and box 33. Through this arrangement, the car cover is supported on tracks 19 by rollers 21 and by angle braces 29 and rollers 28. The same system allows the movement of the car cover halves to be as smooth and frictionless as possible. To ensure that wheels 21 and 22 do not slide off track 19, stops 34 are provided at the outer ends of each track 19.

Movement of the separate halves of the car cover is effected by a cable drive system. The system is comprised of a single cable with its ends joined at turnbuckle 35 or similar joining means. The cable is looped about driveshaft 36, and shaft or wheel 37, such that an upper length of cable 38 and lower length 39 are defined thereby. Both cables extend in parallel fashion along three sides of the railroad car, being looped about the corners where shaft 36 and wheel 37 are not located on pulleys 40 and 41. At the top of drive shaft 36, drive sleeve 42 engages both upper length 38 and lower length 39 at spiral 43, in such fashion that, when the shaft is caused to be rotated, the upper and lower cable lengths are caused to be moved in opposite directions.

This motive force is transmitted to the car cover halves by paired cable attachment devices 44 and 45, each member of pair 44 and 45 being affixed to opposite ends of car cover halves 2a and 2b, respectively. These attachment devices consist of a plate 46 affixed to the lower surface 6 of the ends of car cover halves 2a and 2b, directly below raised portions 7. This plate is affixed to lower surface 6 by bolts 48 and 49 which pass through an additional plate 47 on the interior of the car cover, lower surface 6 of the car cover and plate 46, and are secured with nuts 50 and 51. Plate 47 may be extended in an upward flange 52, and secured to another plate 53 by bolts 55 and 56 passing through plate 53, the end surface 54 of each car cover half and upwardly directed flange 52, and secured with nuts 57 and 58. Plate 53 may further serve as a means for securing wheel mounting 23.

Extending perpendicularly downward from plate 46 of each attachment device is flange 59, which bears holes corresponding to those provided in lower paired fixtures 60 and upper paired fixtures 61. Lower paired fixtures 60 are connected to car cover half 2a and upper paired fixtures 61 are connected to right hand car cover 2b, as is illustrated in FIG. 8. Both pairs of fixtures are secured to downwardly extending flange 59 by U bolts 62 and 63, passing through fixtures 60 and 61, respectively. These U bolts pass through the aligned holes of the fixtures and flange 59, and are secured by nuts 64. Passing through the space defined by paired U bolts 62 and 63 and securely clamped thereby are lower cable 39 and upper cable 38, respectively. The clamping is of such a nature that the cable may not slide through the U bolts, but rather, the motion imparted to each cable by the turning of shaft 36 is transmitted to car cover halves 2a and 2b, causing them to move outward when shaft 36 is rotated in a clockwise direction, and inward when shaft 36 is rotated in the opposite direction. Of course, the direction of movement corresponding to the sense of rotation is a matter of choice. That may be altered by changing the attachment of cable to car cover half. To ensure complete transmission of movement and rigidity of the attaching devices, flange 59 may further be supported by angle brace 65 attached to plate 46.

Shaft 36 is caused to rotate by means of a crank (not illustrated) that may be integrated with the gear mechanism or reduction gear box 66 affixed to the railroad car 1 at base plate 67. Preferably, the crank may be a separate piece, operated manually, its insertion into gear box 66 being accessible from outside railroad car 1. For the reduction gear mechanism of 66, a reduction ratio of 30:1 is preferred. Thus, by the cranking of the gear mechanism of reduction gear box 66, the car cover halves 2a and 2b may be caused to undergo smooth translational movement away from and toward the center of the car.

To ensure that upper and lower cables 38 and 39 do not become twisted or sag while shaft 36 is not being turned, flanges 68 are provided on braces 29, extending upward and perpendicular therefrom. The inner section of flange 68 and brace 29 forms a channel in which the cables may lie. As these are provided throughout the length of the railroad car, no substantial sagging or twisting of the cables may occur.

To ensure that car cover halves 2a and 2b meet at midline 3 in a weather-and-water tight joint, a plurality of interlocking devices 4 may be provided along midline 3, on raised portions 7 as illustrated in FIG. 5. These interlocking apparatus comprise interlocking tongues 69 which extend across midline 3 to opposite halves 2a and 2b of the car cover. These tongues 69 overlap and interlock in such fashion as to exclude water and other contaminants from entering the space below. Interlocking tongues 69 are affixed to L-shaped plates 70 which are in turn affixed to elevated surface 7 and interior wall 5 of the car cover halves. This point of intachment may be further strengthened by the provision of a strengthening element 71 provided in the wall of the car cover halves, parallel to and corresponding to the positioning of L-shaped plate 70. Additional strengthening members may be provided on lower surface 6 and the portion of interior wall 5 extending upward therefrom. As many sets of interlocking tongues 69 may be provided as is necessary to ensure weather-and-water tightness of the midline 3.

As noted above, in preferred embodiments, the railroad car cover of this invention is constructed substantially of fiberglass products, such as Structural Fiberglass Reinforced Plastic, or similar light-weight materials. Certain portions of the car cover, and in particular, the cable drive system and interlocking attachments, may desirably be constructed of high strength materials familiar to those of ordinary skill in the art.

In a preferred embodiment, the cover halves, when rolled outward, provide an opening of dimensions of about 6 ft. by about 48 ft. for convenient loading on a standard open hopper railroad car of dimensions of approximately 11 ft. by 50 ft.

Although the hopper railroad car cover of this invention has been described with particularity, it will be understood that the description provided is for illustration, and that the invention as claimed below contemplates all equivalents within the practice of this railroad car cover. Specifically, the nature, type and quality of the materials employed in the car cover, as well as the particular configuration and method of part interaction may vary according to the understanding and needs of those of ordinary skill in the art.

What is claimed iss:

1. An opening car cover for railroad cars, the walls of said cars defining an upwardly open space, said cover, when closed, extending completely across said opening, comprising:
   a cover member further comprising first and second halves;
   a drive means affixed to said halves and capable of causing said halves to undergo translational movement;
   each said half further comprising an upper surface of alternate raised and lowered portions of a notched shape in cross-section, said alternate raised and lowered portions extending the length of said cover, said upper surface defining dome-shaped envelope in longitudinal cross-section, and a flat lower surface integrally attached to said upper surface and spaced therefrom by integral lateral and longitudinal end portions extending downwardly from said upper surface to said lower surface which said lower surface is supported on the wall of the railroad car through friction reducing means on which it rests;

said cover member being comprised substantially of fiberglass products;

wherein said friction reducing means comprises wheels affixed to said cover halves which engage a track affixed to the lateral ends of said railroad car, and a plurality of rollers supported by braces affixed to the interior of the longitudinal walls of said railroad car, said rollers engaging said lower surface of said car cover halves.

2. The opening cover of claim 1, wherein said drive system comprises a continuous cable looped in a fashion to define upper and lower cable lengths, said upper cable length being affixed to one said cover member half and said lower cable length being affixed to the other cover member half, said continuous cable being engaged by a drive shaft such that when said drive shaft is rotated in one direction, the upper and lower cables lengths are moved in opposite direction, causing said cover member halves affixed thereto to move apart from each other, and when said drive shaft is rotated in the opposite sense, said cover member halves are moved towards each other, whereby said cover member halves undergo translational movement away from and towards the longitudinal midline of the opening of said railroad car.

3. The cover of claim 2, wherein said driveshaft is rotated by means of a reduction gear box actuated by cranking, wherein the reduction ratio of said gear box is 30 to 1.

4. The cover of claim 1, wherein said fiberglass products comprise structural reinforced fiberglass plastic.

5. The cover of claims 1, 2 or 3, wherein both said cover member halves bear a plurality of projecting tongues, which corresponding tongues on each half overlap and interlock so as to provide a weather-and-water tight seal along the junction between the two halves of said cover when said cover halves are adjacent.

6. The cover of claim 4 wherein each said cover member half bears a plurality of projecting tongues, which corresponding tongues on each half overlap and interlock so as to provide a weather-and-water tight seal along the junction between the two halves of said cover when said cover halves are adjacent.

7. The cover member of claim 3, wherein said attachment of said cables to said cover member halves is by means of U-bolts through which said cables pass and are firmly gripped thereby, said U-bolts being affixed to the lower surface of said cover member halves, such that the motion of the upper and lower cable lengths caused by rotation of said drive shaft is transmitted to said cover member halves, whereby translational movement is effected by rotation of the drive shaft in opposite senses.

* * * * *